United States Patent [19]

Vandervelden et al.

[11] 4,103,324
[45] Jul. 25, 1978

[54] SATURABLE REACTOR-TYPE POWER SUPPLY

[75] Inventors: C. Keith Vandervelden, Oakland; William P. Blake, Palo Alto, both of Calif.

[73] Assignee: Airco, Inc., Montvale, N.J.

[21] Appl. No.: 753,404

[22] Filed: Dec. 22, 1976

[51] Int. Cl.² .......................................... H02P 13/24
[52] U.S. Cl. ...................................... 363/89; 204/298; 323/17; 323/89 A; 363/92
[58] Field of Search ............... 219/131 WR; 330/8; 363/86 (U.S. only), 87 (U.S. only), 91 (U.S. only), 92 (U.S. only); 323/56, 89 R, 89 A, 89 P, 89 T, 7, 17, 24; 204/298

[56] References Cited

U.S. PATENT DOCUMENTS

| 2,548,579 | 4/1951 | Bedford | 363/92 |
| 3,627,976 | 12/1971 | Stearns | 323/89 C |
| 3,688,181 | 8/1972 | Leep et al. | 323/89 TC |
| 3,845,380 | 10/1974 | Leep et al. | 323/7 |
| 3,906,289 | 9/1975 | Leep et al. | 219/131 R |
| 3,971,975 | 7/1976 | Genuit | 363/91 |

Primary Examiner—Gerald Goldberg
Attorney, Agent, or Firm—D. A. Draegert; E. W. Bopp; L. R. Cassett

[57] ABSTRACT

Power supply of the saturable reactor type is disclosed. The improvement is the inclusion of a variable impedance network, such as a pair of opposed semiconductor controlled rectifiers, in series with the current winding of the saturable reactor. Also included is an electronic circuit for changing the impedance of the variable impedance circuit, such as a control circuit for monitoring an operating parameter and for enabling or disabling the firing of the semiconductor controlled rectifiers in response to a change in the operating parameter. A preferred embodiment of the power supply also includes a transformer and a rectifier for supplying high-voltage, direct current to a sputtering apparatus.

16 Claims, 2 Drawing Figures

SATURABLE REACTOR-TYPE POWER SUPPLY

BACKGROUND OF THE INVENTION

The present invention is in the field of high-current, high-voltage power supplies, such as are used with dc sputtering systems.

In a sputtering process, an anode and a cathode, which comprises a target of material to be sputtered, are placed in a chamber containing an ionizable gas at a reduced pressure. When the electrodes are connected to a source of electric potential, a glow discharge is established, material is removed from the target by ionic bombardment, and a deposit forms on a nearby substrate. The required potential depends upon several factors including the sputtering gas pressure. The sputtering rate and the deposition rate increase with glow discharge current. In dc reactive sputtering, a conductive target is sputtered in an atmosphere containing a reactive gas, and a compound is formed on the substrate. One such example is the sputtering of titanium in oxygen to form titanium oxide.

One particular type of sputtering apparatus is particularly useful because it obtains very high sputtering rates. One such apparatus is described by John S. Chapin in "The Planar Magnetron," Research/Development, Vol. 25, No. 1, pp 37 – 40, January 1974. Typically, planar magnetron sputtering systems utilize power supplies of the saturable reactor type. Examples of such supplies are Models SP-5 and SP-15 constant current supplies manufactured and sold by the Airco Temescal Division of Airco, Inc.

A saturable reactor has a current winding and a control winding which are interlinked by a core of magnetic iron. The current winding is usually connected in series with an alternating current source and a load. The saturable reactor tends to maintain a given magnitude of current in the current winding despite changes in the load impedance. The magnitude of the current passing in the current winding is varied by adjusting a much smaller current passing in the control winding. The operation of saturable reactors is well known, as are many reactor control circuits for providing current to the control winding. These devices and circuits are described by H. F. Storm in "Magnetic Amplifiers," John Wiley, New York, 1955.

Despite their weight and bulk, saturable rectors are widely used to provide precise regulation and control of large alternating currents. However, the normal response time of a saturable reactor is relatively long. Because of the reactance of the control winding, one or two seconds are typically required to cut off the current in the current winding by varying the current in the control winding.

One problem which occurs in planar magnetron sputtering systems is arcing in the vicinity of the target. Several types of arcs occur, two of which are discussed in the above-mentioned article by John Chapin. As indicated therein, one type of arc, called a "racetrack arc," is a particularly severe problem in a dc reactive sputtering system which uses a planar magnetron source. In such a sputtering system, arcs occur at random intervals at average rates which vary within a wide range. A typical rate is two arcs per second. In the incipient stages of an arc, the arc current usually rises in a very short time, such as less than 1 millisecond. Usually, the magnitude of the arc current is ultimately limited by the capabilities of the power supply. The duration of an arc also varies over a wide range from about a millisecond to essentially continuous.

Arcing in a sputtering system is a problem for several reasons. First, the power supply itself may be damaged unless there is provision to limit the maximum current. Second, even with a constant current supply, arcing causes variations in the sputtering rate since the high current in the localized arc reduces the rate of ionic bombardment over most of the surface of the target. In particular, when a partially transmitting film is deposited on a rapidly moving sheet of architectural glass, a sustained arc causes a visual imperfection, a spot or stripe, across that portion of the sheet which was adjacent the target during the arc.

An established arc can be extinguished by switching off the sputtering potential. After a short time interval, the potential can be restored without re-igniting the arc. The length of time required varies with operating conditions, but a delay of about 40 milliseconds is usually adequate for quenching arcs.

Reactor control circuits which could detect arcs and other rapid changes in operating parameters could be designed easily. However, because of the long response time, the magnitude of the control current cannot be varied rapidly enough to cut off and restore the load current in a time comparable to the short time required for quenching arcs. With prior art, constant current supplies of the type previously mentioned, the presence of an arc was detected by an operator who switched the sputtering potential manually by interrupting the input current to the power supply.

SUMMARY OF THE INVENTION

The present invention relates to a method and an improved power supply of the saturable reactor type. The improvement is the inclusion of an electronically variable impedance means in series with the current winding of the saturable reactor, and an electronic means for changing the impedance of a variable impedance means. The variable impedance means allows the current in the current winding, and, thus, the output of the power supply, to be varied more rapidly than is possible by varying the control current.

Preferably, the variable impedance means comprises a semiconductor network, such as a pair of opposed silicon controlled rectifiers (SCRs). The use of these devices ensures that the source current is switched only when it crosses through zero. This greatly decreases the magntude of inductive switching transients and ratio frequency interference generated by switching large currents. For 60 Hz alternating current, each phase of the current crosses zero every 8 milliseconds.

When the variable impedance means comprises a pair of opposed SCRs, the preferred impedance changing means comprises a means for enabling and disabling firing of the SCRs in response to an SCR control circuit. The SCR control circuit may have several functions, such as monitoring an operating parameter of the power supply or the external load, reducing the output of the power supply in response to a change in the operating parameter, automatically restoring the output after it is reduced, and adjusting the time delay between reduction and restoration of the output of the power supply.

The improved power supply offers several significant advantages. First, it can respond to changes in an operating parameter in a much shorter time than a conventional saturable reactor-type power supply. This advantage results because the load current is reduced and restored by the variable impedance means rather than by a change in control current of the saturable reactor. This advantage is of great significance in a sputtering system because arcs can be automatically detected and extinguished with only minor fluctuations in deposition rate.

Second, the output of the power supply can be held constant or varied in a programmed way as desired. Slow variations in the output of the power supply are obtained by modulating the output of a conventional reactor control circuit. More rapid variations in the output are obtained by modulating the output of the SCR control circuit.

Third, the output of the power supply is reduced and restored to its normal value without excessive over- or undershoot. This results because the reactance of the control winding of the saturable reactor tends to maintain the magnitude of the control current while the output is at the reduced value.

Fourth, the output of the power supply is reduced and restored rapidly without generating large switching transients or radio frequency interference because the source current is switched only at zero-crossings and because the reactance of the current winding is in series with the variable impedance switching means.

The improved power supply operates from a source of alternating current and may comprise a rectifier means in order to supply direct current to an external load. A transformer may be included to provide the desired output voltage.

DESCRIPTION OF THE PREFERRED EMBODIMENT

Figure 1:
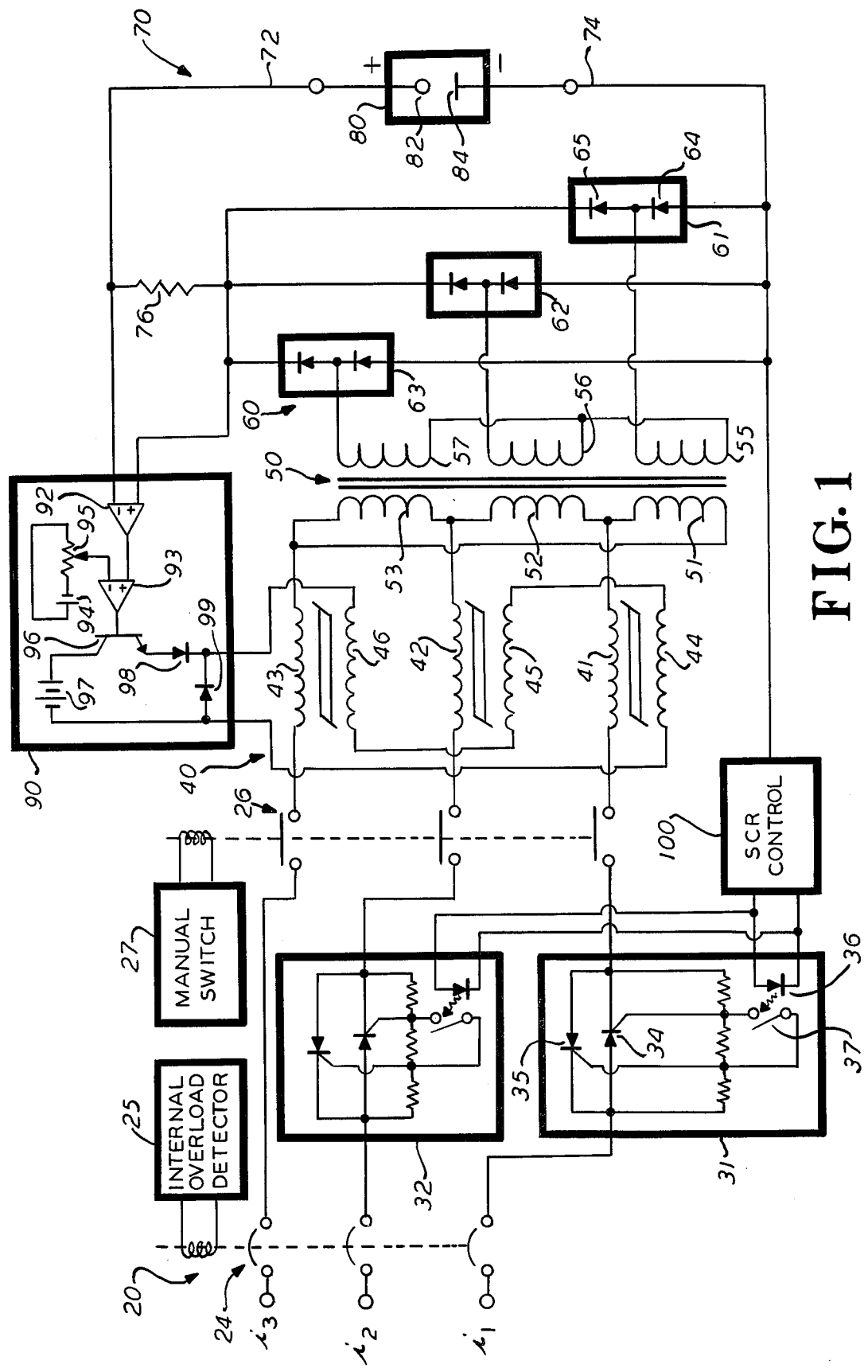
FIG. 1 is a schematic diagram of a preferred embodiment of a power supply according to the present invention.

A schematic diagram of the preferred embodiment of a power supply according to the present invention is shown in FIG. 1. This embodiment is designed for operation from a source of three-phase, 50 to 60 Hz alternating current at 480 V. The power supply is connected to the input currents by conventional input terminal means 20, such as a conventional circuit breaker 24, designed to interrupt all three input currents $i_1$, $i_2$, and $i_3$ when any one exceeds a preset value. Breaker 24 can also be tripped by a relay activated by an over-voltage or other abnormal condition internal to the power supply. The abnormal condition within the power supply is detected by a conventional internal overload detector 25.

When breaker 24 is closed, currents $i_1$ and $i_2$ are applied to conventional SCR modules 31 and 32, respectively. Each SCR module contains a large number of circuit elements, including two opposed, high-current silicon controlled rectifiers, a firing circuit, and a solid state relay incorporating a photo-isolation stage. Two suitable SCR modules are commercially available in a single package, such as model RSD 4875 sold by Crydom Controls Division of International Rectifier. For simplicity of description, most of the internal elements of the SCR modules are omitted and each module is represented by a simple functionally equivalent circuit as shown inside each block 31, 32, in FIG. 1.

The operation of both SCR modules is controlled by SCR control circuit 100. A complete schematic diagram and the operation of a suitable SCR control circuit are discussed subsequently. During normal sputtering operation, SCR modules 31 and 32 present a low impedance to input currents $i_1$ and $i_2$, respectively, which are thus applied to first and second terminals of mechanical contactor 26. Input current $i_3$ is connected directly to a third terminal of contactor 26.

Mechanical contactor 26 is a conventional switching device comprising a relay which is activated manually by a pushbutton switch 27 or other device. The purpose is to provide a convenient and certain means for connecting or disconnecting the input currents $i_1$, $i_2$, and $i_3$ to the current windings 41, 42 and 43, respectively, of three saturable reactors 40. The control windings 44, 45, and 46 of the three saturable reactors are connected in series with an adjustable source of control current. Preferably, the three saturable reactors are identical; one suitable reactor is model QTE 2308 commercially available from Quality Transformer & Electronics, Milpitas, Calif.

Control current for saturable reactors 40 is provided by a conventional reactor control circuit 90. The actual circuit has many elements, but for simplicity the circuit is represented by the functionally equivalent circuit shown inside block 90 in FIG. 1. The reactor control circuit monitors the power supply output by sensing the potential across resistor 76 connected in series with the output current of the power supply. The sensed potential is amplified by operational amplifier 92, the output of which is connected to the positive input terminal of a second operational amplifier 93. This input is compared with an adjustable reference potential applied to the negative input terminal of operational amplifier 93. The reference potential is derived from a potential source 94 and is adjusted by potentiometer 95 which is thus a "current set" control. The output of operational amplifier 93 is connected to a pass-element, such as transistor 96, which controls the current flowing from potential source 97 to control windings 44, 45, and 46. Minor ripple fluctuations in the potential across resistor 76 are amplfied by the high gain of amplifiers 92 and 93 so that the output of amplifier 93 is chopped and the control current is pulse-modulated. Diode 98 protects the circuit from reverse currents. Diode 99 is a commutating diode which provides a current path when transistor 96 is off. Thus, reactor control citrcuit 90 monitors the power supply output, compares the monitored output with a manually adjustable reference, and supplies the proper current to control windings 44, 45 and 46 in order to maintain that magnitude of currents $i_1$, $i_2$, $i_3$ in current windings 41, 42, 43 which will establish an output current of the desired magnitude.

Current windings 41, 42, and 43 are also connected to primary windings 51, 52, and 53 of three-phase transformer 50. Transformer 50 has a turns ratio of 1:1 but other ratios can be used to step-up or step-down the voltage as desired. Secondary windings 55, 56, and 57 are connected to a three-phase fullwave rectification means 60. The rectification means comprises three rectifier modules 61, 62, and 63. Each rectifier module actually contains a large number of individual devices. Again for simplicity of description, each rectifier module is represented by the functionally equivalent circuit comprising two diodes, such as 64 and 65, as shown inside blocks 61, 62, and 63 in FIG. 1. A suitable rectifier module is model SD18A36S1531, commercially available from Westinghouse Electric Corporation. The rectification means is also connected to sensing resistor 76 and conventional output terminal means 70, such as electrical conductors 72 and 74.

The output of the power supply is a high-voltage, variable direct current, such as up to 30 A at 1 kV, which is suitable for operating a sputtering system. The output terminals of the power supply are connected to the anode 82 and cathode 84 of sputtering apparatus 80.

In actual practice, additional circuit devices are provided in rectification stage 60 in order to protect the rectifiers and other circuit elements from damage by ratio frequency noise and transient currents which may be generated in sputtering apparatus 80 or in any of the mechanical (24, 26) or electronic (31, 32) line current switching devices. Because the selection and placement of such protective devices are well known to power supply designers, these devices are omitted from FIG. 2 for the sake of clarity. The commercially available model SP-5 and SP-15 power supplies mentioned previously contain illustrative examples of such protective devices.

The preferred embodiment of the power supply operates as follows: during normal sputtering operation, the output signal of SCR control circuit 100 is about 20 mA at 10 V. This current passes through infrared emitting diode 36, internal to SCR module 31. The infrared output of diode 36 is detected by a photodetector which effectively maintains switch 37 in its closed position, thus enabling opposed SCRs 34 and 35 to fire alternatively on each half-cycle of input current $i_1$. As a result, SCR module 31 presents a very low impedance to input current $i_1$. Similarly, the output of SCR control circuit 100 enables SCR module 32 to present a very low impedance to input current $i_2$. Thus, input currents $i_1$, $i_2$, and $i_3$ are applied to current windings 41, 42, and 43 of the three saturable reactors. Reactors 40, reactor control circuit 90, transformer 50, and rectification means 60 all operate in a conventional manner to supply a constant direct current to sputtering apparatus 80.

When an arc occurs in the sputtering apparatus, the first function of SCR control circuit 100 is to detect the presence of the arc. In most dc sputtering systems, the anode is at or near ground potential, and the cathode is at a large negative potential during normal operation. When an arc occurs, the impedance of the sputtering system decreases and the cathode voltage to ground decreases. Thus, monitoring of the sputtering cathode voltage is one method by which an arc can be detected.

If the arcing is sufficiently severe, in either magnitude or duration, the output signal of SCR control circuit 100 drops from 10 V to about 0.1 V and infrared diode 36, internal to SCR module 31, receives insufficient drive current to maintain internal switch 37 in its closed position. SCRs 34 and 35, internal to SCR module 31, can not fire when switch 37 is open. Line current $i_1$ is interrupted at its next zero-crossing following the drop in the output signal of SCR control circuit 100. Similarly, the drop in signal output of SCR control circuit 100 causes the interruption of line current $i_2$ at its next zero-crossing.

When two input currents $i_1$ and $i_2$ are interrupted, all currents in the primary windings of transformer 50 are cut off. The result is to cut back the dc current supplied to sputtering apparatus 80 and thus extinguish the arcing which initiated the cutback. Typically, the sputtering current is reduced essentially to zero within about 20 milliseconds after the occurence of a strong arc.

After an adjustable time-delay, SCR control circuit 100 restores normal signal to infrared emitting diode 36 and switch 37 closes. This enables SCRs 34 and 35 to fire at the next zero-crossing of the alternating input potential, and input current $i_1$ is restored to the saturable reactors. Similarly, restoration of normal signal to SCR module 32 enables restoration of current $i_2$ to the saturable reactors. Because the current in the control windings 44, 45, and 46 was not interrupted by the arcing, the sputtering current quickly obtains the desired value, set by reactor control circuit 90. Typically, the normal magnitude of the sputtering current is restored within about 60 milliseconds after the occurence of a strong arc.

Figure 2:
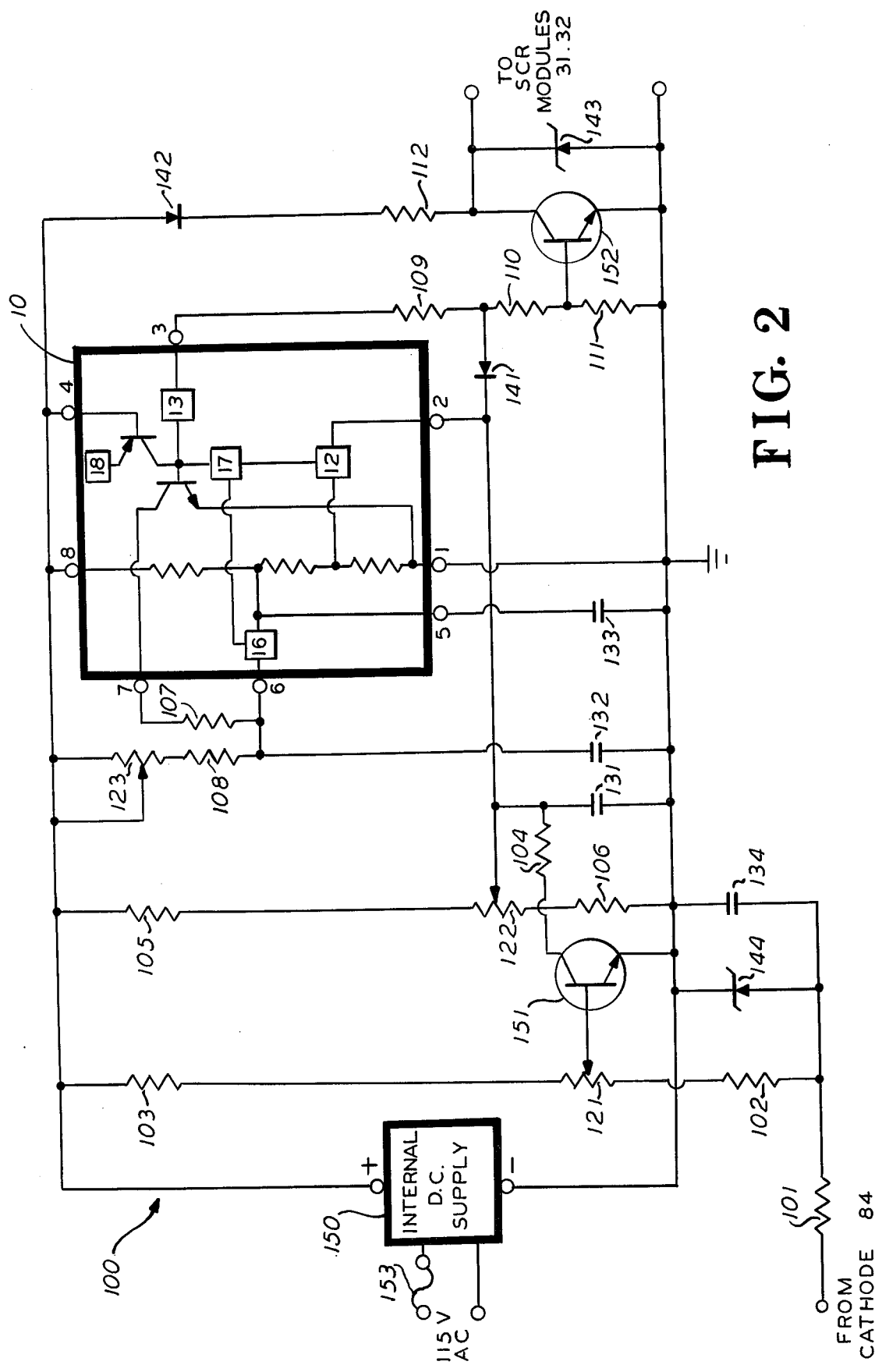
FIG. 2 is a preferred embodiment of a suitable SCR control circuit.

A preferred embodiment of a suitable SCR control circuit 100 is shown in FIG. 2. Circuit 100 is powered by a conventional internal dc supply 150 connected via protective fuse 153 to a source of 115 V alternating current. One suitable dc supply is PC series model 32B15D, commercially available from Powertec, Inc., which provides 100 mA at 15 V. SCR control circuit 100 also includes a conventional timing module 10, such as type LM 555 linear integrated circuit, commercially available from National Semiconductor Corporation. The characteristics and operation of such timing modules are well known. For the present purpose, the timing module is represented by the functionally equivalent circuit inside block 10 in FIG. 2.

Resistors 101, 102, 103, and potentiometer 121 form a voltage divider between the sputtering cathode 84 and the positive output terminal of supply 150. The negative terminal of supply 150 is grounded. Potentiometer 121 is adjusted so that the base of transistor 151 is normally less than about 0.6 V and the transistor is "off." When an arc occurs, the sputtering cathode voltage rises toward ground potential. If the base of transistor 151 rises above about 0.6 V, the transistor turns "on" and begins discharging capacitor 131 through resistor 104. If the arc is shortlived and the sputtering cathode voltage drops, transistor 151 is turned "off" again and capacitor 131 recharges by means of the voltage divider formed by resistors 105, 106, and potentiometer 122.

Potentiometer 121 is a "threshold set" control which allows adjustment of the magnitude of the rise in cathode voltage which will discharge capacitor 131. Potentiometer 122 is an "arc rate set" control which allows adjustment of the rate at which capacitor 131 is recharged. Capacitor 131 provides integration of the magnitude and duration of the cathode voltage rises caused by arcing in the sputtering system.

The voltage across capacitor 131 is monitored by a comparator circuit 12, internal to timing module 10. If the voltage on capacitor 131 drops below about 5 V, flip-flop circuit 17, internal to timing module 10, is triggered and an internal output circuit 13 causes the potential at pin 3 of timing module 10 to increase from the normal value of about 0.1 V to 12.5 V. This potential rise occurs across a voltage divider formed by resistors 109, 110, and 111 and results in a rise in the potential at the base of transistor 152 which turns it "on." Thus, the voltage drop across resistor 112 increases and the output signal of SCR circuit 100 drops from the normal value of about 10 V to 0.1 V. As described previously, the result is to increase the impedance of SCR modules 31 and 32 and to reduce the sputtering current, thereby extinguishing the arcing.

The next function of SCR control circuit 100 is to restore the sputtering current. Simultaneously with the above-mentioned increase in the potential at pin 3 of timing module 10, the current through pin 7 and resistor 107 decreases and capacitor 132 begins charging via resistor 108 and potentiometer 123. The voltage across capacitor 132 is monitored by comparator 16, internal to timing module 10. When this voltage rises above about 10 V, internal flip-flop 17 is triggered again and the potential at pin 3 is reset to about 0.1 V. This causes transistor 152 to return to its normal "off" state, and the normal output signal of SCR control circuit 100 is restored.

Potentiometer 123 is an "off time delay" control which adjusts the rate at which capacitor 132 charges and thus the time interval during which the sputtering current is reduced.

While output 3 of timing module 10 is at 12.5 V, diode 141 allows integrating capacitor 131 to recharge rapidly so that it will be prepared to detect additional arcs after sputtering current is restored. When pin 3 is reset to 0.1 V, the potential at pin 7 drops and reset-delaying capacitor 132 is discharged via resistor 107. Pins 4 and 8 are connected to the positive terminal of dc supply 150 in order to prevent false resets.

Block 18, internal to timing module 10, represents a reference voltage source. Capacitor 133 connected to pin 5 is a noise filter. Diodes 142 and 143 protect SCR control circuit 100 from line-switching transients generated in the SCR modules. Diode 144 and capacitor 134 protect circuit 100 from overvoltage conditions and high-frequency noise in the sputtering system.

Suitable numerical values for the resistors, capacitors, and other elements of the preferred embodiment of SCR control circuit 100 are given in the Table.

In the embodiment shown in FIG. 1, SCR modules 31 and 32 are connected to primary windings 51 and 52 of transformer 50 through current windings 41 and 42. In an alternative embodiment, SCR module 31 is connected between secondary winding 55 and rectifier module 61, and SCR module 32 is connected between secondary winding 56 and rectifier module 62. The SCR modules are still effectively connected in series with the current windings, and the alternative embodiment is intended to be within the scope of the claims. If a step-up transformer is used, it is preferred to connect the variable impedance means to the primary winding (as in FIG. 1) because suitable semiconductor networks are currently more readily available for lower voltage.

Because the present invention is particularly adapted for supplying high powers, the preferred embodiment is operated by three-phase alternating current. However, workers in the art will recognize that a power supply which operates from a source of single-phase alternating current can be constructed following the teachings of the three-phase embodiment. Such a single-phase power supply could comprise input terminal means, a single SCR module, a single saturable reactor, a single-phase transformer, a single-phase rectification means, output terminal means, reactor control circuit, and an SCR control circuit. The circuit of a single-phase power supply could be similar to that of FIG. 1 if elements 32, 42, 56, 62 were eliminated and elements 45, 46, 52, 53, 43, and 57 were replaced by simple electrical conductors. The SCR and reactor control circuits of the single-phase power supply could be substantially the same as those for the three-phase embodiment.

TABLE:

| CIRCUIT ELEMENTS OF SCR CONTROL CIRCUIT | | | |
|---|---|---|---|
| Resistor | kΩ | Capacitor | μF |
| 101 | 500 | 131 | 4 |
| 102 | 12 | 132 | 1 |
| 103 | 22 | 133 | 0.01 |
| 104 | 51 | 134 | 0.0005 |
| 105 | 180 | | |
| 106 | 250 | | |
| 107 | 0.047 | | |
| 108 | 51 | Diode | Type |
| 109 | 1 | 141 | 1N4006 |
| 110 | 4.7 | 142 | 1N4006 |
| 111 | 4.7 | 143 | 1N4749 |
| 112 | 0.180 | 144 | 1N4749 |
| Transistor | Type | | |
| 151 | 2N3053 | | |
| 152 | 2N3053 | | |

What is claimed is:

1. A power supply which is operated from a source of three-phase alternating input current and which provides a direct current output to an external load, comprising:
   first, second, and third saturable reactors, each comprising a current winding and a control winding;
   first pair of opposed semiconductor controlled rectifiers connected in series with the current winding of the first saturable reactor;
   second pair of opposed semiconductor controlled rectifiers connected in series with the current winding of the second saturable reactor;
   a transformer comprising three primary windings connected to the current windings of the three saturable reactors, and three secondary windings;
   a rectification means connected to the three secondary windings of the transformer for obtaining direct current;
   first control circuit for establishing normal output current of the power supply by providing an adjustable control current to the control windings of the saturable reactors;
   second control circuit for monitoring an operating parameter of the external load and for altering the firing of the semiconductor controlled rectifiers to change the output current in response to a change in the operating parameter.

2. The power supply according to claim 1 wherein the extenal load is a sputtering apparatus and the second control circuit comprises:
   means for detecting an arc in the sputtering apparatus;
   means for disabling firing of the semiconductor controlled rectifiers in response to the arc; and
   automatic means for enabling firing of the semiconductor controlled rectifiers to restore the normal output current.

3. The power supply according to claim 2 wherein the second control circuit further comprises
   means for adjusting the time delay between the reduction and restoration of the output current.

4. The power supply according to claim 3 wherein the second control circuit further comprises
   means for integrating the magnitude and duration of arcing which will cause the output current to be reduced.

5. The power supply according to claim 4 wherein the operating parameter which is monitored is the sputtering cathode voltage.

6. An improved power supply of the type which operates from a source of alternating input current, provides an output current to an external load, and includes
    a saturable reactor comprising a current winding and a control winding, and
    a reactor control citrcuit for establishing the normal output of the power supply by providing control current to the control winding, wherein the improvement comprises:
    electronically variable impedance means connected in series with the current winding and the external load for varying the current in the current winding more rapidly than is possible by varying the current in the control winding; and
    electronic means for monitoring an operating parameter and for changing the impedance of the variable impedance means to vary the output of the power supply between the normal output and essentially zero output within a time interval less than twice the period of the alternating input current in response to a change in the operating parameter.

7. A power supply according to claim 6 wherein the variable impedance means comprises a pair of opposed semiconductor controlled rectifiers.

8. A power supply according to claim 6 wherein the impedance changing means comprises:
    means for enabling firing of the semiconductor controlled rectifiers to obtain the normal output; and
    means for disabling firing of the semiconductor controlled rectifiers to reduce the output of the power supply.

9. A power supply according to claim 1 further comprising rectification means for providing a direct output current.

10. A power supply according to claim 9 wherein the variable impedance means comprises a pair of opposed semiconductor controlled rectifiers, and the impedance changing means comprises:
    means for disabling firing of the semiconductor controlled rectifiers to reduce the output of the power supply in response to a change in the operating parameter;
    means for automatically enabling the firing of the semiconductor controlled rectifiers to restore the normal output of the power supply after it is reduced; and
    means for adjusting the time delay between reduction and restoration of the output of the power supply.

11. A power supply according to claim 10 wherein the impedance changing means further comprises:
    means for adjusting the magnitude of the change in the operating parameter which will disable firing of the semiconductor controlled rectifiers.

12. A power supply according to claim 11 wherein the impedance changing means further comprises:
    means for adjusting the duration of the change in the operating parameter which will disable firing of the semiconductor controlled rectifiers.

13. A method of varying the output of a saturable reactor type power supply which operates from a source of alternating current and provides an output to a load, comprising
    establishing the normal magnitude of the output by providing a control current to the control winding of the saturable reactor;
    electronically monitoring an operating parameter to detect a change;
    varying the output between the normal magnitude and essentially zero within a time interval less than twice the period of the alternating current in response to the change in the operating parameter by varying the impedance of an electronically variable impedance means connected in series with the current winding of the saturable reactor and the load.

14. The method according to claim 13 wherein the output is varied by altering the firing of a pair of opposed semiconductor controlled rectifiers.

15. The method according to claim 14 further comprising rectifying the output to provide a direct current output.

16. The method according to claim 15 wherein the output is reduced in response to arcing in a planar magnetron sputtering apparatus connected to the power supply, and further comprising:
    automatically restoring the normal magnitude of the output after a time delay sufficient to quench the arcing.

* * * * *